United States Patent
Knollman

[19]

[11] Patent Number: 5,854,550
[45] Date of Patent: Dec. 29, 1998

[54] TRANSFORMERLESS DIGITAL-LINE BATTERY FEED CIRCUIT

[75] Inventor: Dieter J.H. Knollman, Arvada, Colo.

[73] Assignee: Lucent Technologies Inc., Murray Hill, N.J.

[21] Appl. No.: 964,383

[22] Filed: Nov. 6, 1997

[51] Int. Cl.[6] .................................................. H04B 3/36
[52] U.S. Cl. .................... 320/127; 320/162; 320/163; 320/165; 379/413; 379/402; 379/403; 379/377; 379/399
[58] Field of Search ....................................... 320/127, 162, 320/163, 165, 148, 150, DIG. 27; 379/413, 402, 403, 377, 399

[56] References Cited

U.S. PATENT DOCUMENTS

| | | |
|---|---|---|
| 4,007,335 | 2/1977 | Hetherington et al. . |
| 4,419,542 | 12/1983 | Embree et al. . |
| 4,612,417 | 9/1986 | Toumani . |
| 4,656,661 | 4/1987 | Carbrey ................................. 379/399 |
| 4,736,415 | 4/1988 | McNeill et al. . |
| 4,803,721 | 2/1989 | Schingh ................................. 379/399 |
| 5,444,777 | 8/1995 | Condon et al. . |
| 5,528,688 | 6/1996 | Schorr . |

*Primary Examiner*—Edward Tso
*Attorney, Agent, or Firm*—David Volejnicek

[57] ABSTRACT

A transformerless battery feed circuit for a digital telecommunications line (100) presents a high impedance to digital signals and a low impedance to direct current, and provides a constant-voltage feed with current limiting. The battery feed circuit comprises a pair of transformerless controlled current sources, one for each lead (T,R) of the line, each taking the form of a high-gain transistor (Q1, Q2) having a collector coupled to a source of power (e.g., a battery V1), a base resistively coupled to the power source and capacitively coupled to its corresponding lead, and an emitter coupled to its corresponding lead. The battery feed circuit further comprises a pair of control circuits, one for each current source, each taking the form of a transistor (Q3, Q4) having a collector coupled to the base of the corresponding high-gain transistor, a base resistively coupled to the emitter of the corresponding high-gain transistor and to the power source, and an emitter coupled to the corresponding lead.

7 Claims, 1 Drawing Sheet

TRANSFORMERLESS DIGITAL-LINE BATTERY FEED CIRCUIT

CROSS-REFERENCE TO RELATED APPLICATION

Application of D. J. H. Knollman, entitled "Dual-Limit Current-Limiting Battery-Feed Circuit for a Digital Line", filed on even date herewith.

TECHNICAL FIELD

This invention relates generally to telephony line interface circuits, and specifically to transformerless battery feed circuits of digital-line interface circuits.

BACKGROUND OF THE INVENTION

A line interface circuit couples a telephone line to a telephone switching system. Among other things, it serves to provide both AC and DC power to the telephone line to operate the communication equipment (e.g., telephone) that is connected to the line. This function of supplying the DC power is performed by the battery feed circuit of the line interface circuit.

A variety of battery feed circuits have been used over time. The most common design employs a large inductor with two windings (e.g., a transformer), one connected from the tip lead of the telephone line to ground and the other connected from the ring lead to a power supply (e.g., a battery). The two windings are closely coupled, whereby a high impedance is presented to differential signals on the tip and ring leads of the telephone line and a low impedance is presented to common-mode (longitudinal) signals. Not only are the inductors relatively expensive, they are also physically bulky and therefore result in large secondary costs due to packaging. Moreover, they require a separate current limiting circuit to protect the power feed. For these reasons, it is desirable to implement a battery feed circuit using integrated or discrete circuit technology rather than the transformer or other discrete inductors.

Prior art transformerless, electronic, battery feed circuits typically replace the inductors with differential operational amplifiers that synthesize, or emulate, the inductors which they replace, and a feedback circuit to ensure the production of the required currents on the tip and ring leads. These electronic battery feed circuits are used for analog telephone lines, which require the resistive feed which these circuits emulate. A resistive feed is one where the DC resistance is the same as the AC impedance. In contrast, digital telephone lines require a constant-voltage feed with current limiting.

SUMMARY OF THE INVENTION

In accordance with the invention, a technical advance in the art is achieved by constructing a transformerless battery feed circuit for a digital communications line having a pair of leads, as follows.

A pair of controlled transformerless current sources are employed, one for each said lead, each to supply direct current to its corresponding lead. Furthermore, a pair of control circuits are employed, one for each said current source, each to sense voltage across its corresponding current source and to cause its corresponding current source to supply an amount of current that is inversely proportional to the sensed voltage. Each control circuit also senses current supplied by its corresponding current source and causes its corresponding current source to limit its supplied current to below a predetermined maximum current. Preferably, each control circuit further causes its corresponding current source to cease supplying current when the sensed voltage exceeds a predetermined maximum voltage. The battery feed circuit thus provides both current limiting and voltage limiting for the digital communications line.

Each current source presents a high impedance to digital signals on its corresponding lead and presents a low impedance to direct current on its corresponding lead, as is conventionally required by a telecommunications line. This is preferably effected in a simple and inexpensive manner, by the current sources wherein each current source comprises a high-gain transistor device that has a collector terminal coupled to a source of power (e.g., a battery), a base terminal resistively coupled to the source of power and capacitively coupled to its corresponding lead, and an emitter terminal coupled to its corresponding lead, and by the associated control circuits. The control is preferably also effected in a simple and inexpensive manner, by the control circuits wherein each control circuit comprises a transistor device that has a collector terminal coupled to the base terminal of the corresponding high-gain transistor device, a base terminal resistively coupled to the emitter terminal of the corresponding high-gain transistor device and to the source of power, and an emitter terminal coupled to the corresponding lead.

The battery feed circuit as characterized above eliminates the bulk and expense of using a transformer with a separate current-limiting circuit to feed direct current to the telecommunications line, yet at the same time it provides the constant-voltage feed with current limiting required by a digital telecommunications line.

These and other advantages and features of the invention will become more apparent from the following description of an illustrative embodiment of the invention considered together with the drawing.

BRIEF DESCRIPTION OF THE DRAWING

The FIGURE is a schematic diagram of a transformerless digital-line battery feed circuit implementing an illustrative embodiment of the invention.

DETAILED DESCRIPTION

Figure 1:
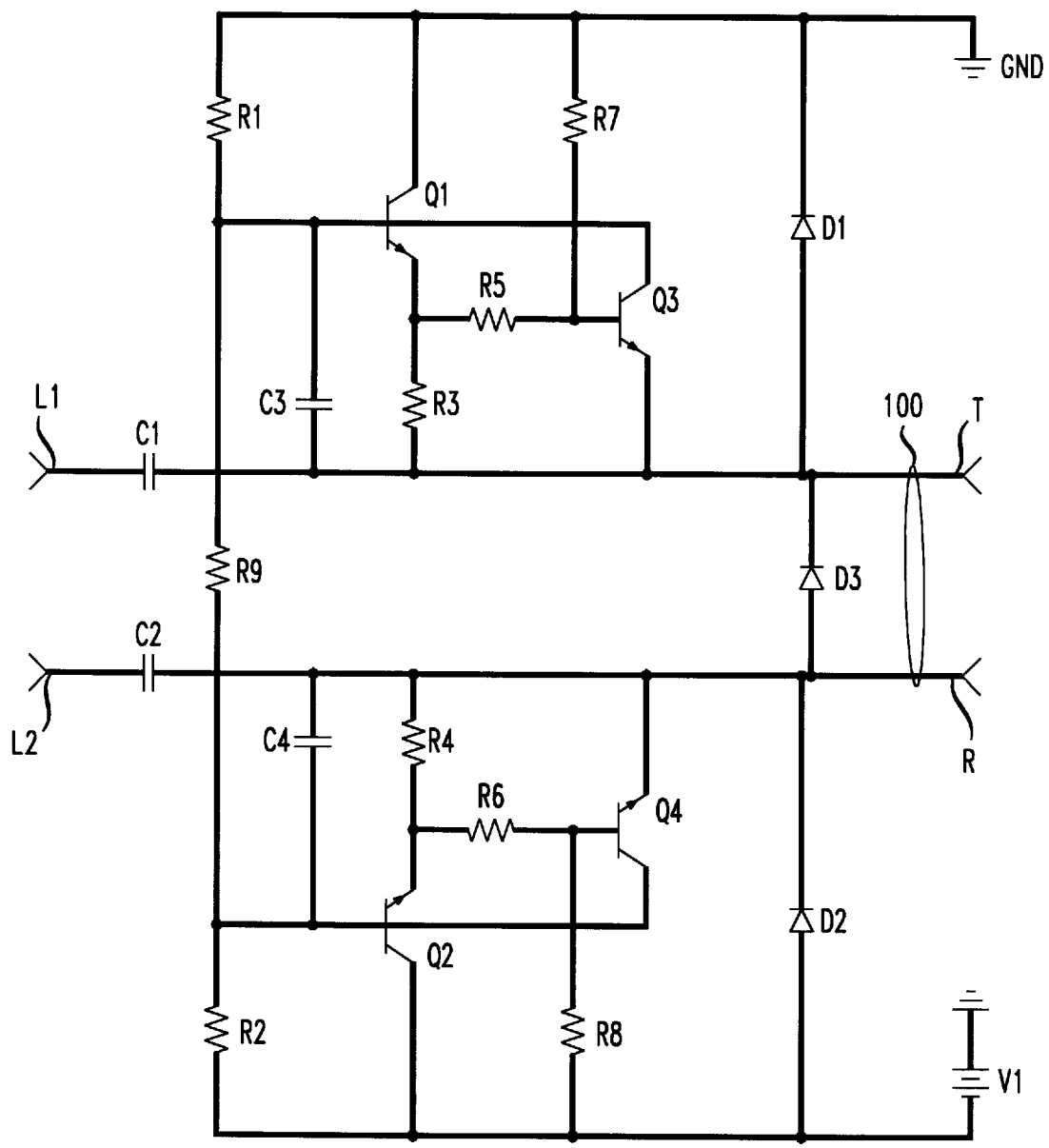

The FIGURE is a schematic diagram of a transformerless digital-line battery feed circuit constructed according to the invention. Battery V1 and ground GND form a source of DC power for tip lead T and ring lead R of a digital telephone line 100, while lines L1 and L2 are a source and a sink of AC signals (e.g., communications traffic signals) for line 100. Lines L1 and L2 operate in balanced mode; that is, the inverse of any signal applied to line L1 is applied to line L2, and vice versa. Line L1 is conventionally coupled to tip lead T via a capacitor C1, and line L2 is conventionally coupled to ring lead R via a capacitor C2. The capacitor values are selected such that the capacitor impedance is much less than the line impedance of telephone line 100 at the AC (digital pulse) frequency. For example, setting $C1=C2=0.47\mu F$ creates a series impedance of less than 4 $\Omega$ at frequencies above 100 kHz. The capacitors thus present a low impedance to the AC pulses, and couple the AC pulses to and from leads T and R. The capacitors also block DC current from flowing to and from lines L1 and L2.

According to the invention, inductors connecting ground GND and battery V1 to tip lead T and ring lead R have been replaced with an electronic circuit. But unlike the replacement electronic circuits of the prior art, which emulate the inductor impedance function, this circuit merely produces an impedance change so as to provide a high impedance to the AC pulses and a low impedance to DC power.

The basic circuit comprises a pair of transformerless controlled current sources, one for each lead of line 100. The current source for tip lead T comprises a high-gain NPN transistor Q1 having its collector connected to ground GND, its base connected through a resistor R1 to ground GND and through a capacitor C3 to tip lead T, and its emitter connected through a resistor R3 to tip lead T. The current source for ring lead R comprises a high-gain PNP transistor Q2 having its collector connected to battery V1, its base connected through a resistor R2 to battery V1 and through a capacitor C4 to ring lead R, and its emitter connected through a resistor R4 to ring lead R. Illustratively, each transistor Q1 and Q2 is a Darlington pair.

At AC pulse (digital signal) frequency, capacitors C3 and C4 effectively short the bases of transistors Q1 and Q2 to telephone line 100. This prevents the transistors from operating at the AC pulse frequency, creating what is essentially an open circuit across transistors Q1 and Q2. Hence, the impedance of telephone line 100 to ground GND and battery V1 at the AC frequency is determined by resistors R1 and R2. To minimize any possible effect on AC operation, resistors R1 and R2 should be much larger than the impedance of line 100, which is typically about 100 Ω. Resistors R3 and R4 increase the transistor input impedance to allow smaller values for capacitors C3 and C4.

At low frequencies and DC, capacitors C1 and C2 act as open circuits and allow transistors Q1 and Q2 to operate. The transistors reduce the effective impedance of the circuit by the transistor gain HFE. Thus, the DC feed impedance becomes R1/HFE(Q1)+R3+R2/HFE(Q2)+R4. For example, with R1=R2=20 KΩ, R3=R4=5Ω, and HFE(Q1)=HFE(Q2) =2000, the AC impedance from telephone line 100 to ground is 20 KΩ, while the DC feed resistance is 30 Ω.

The bases of transistors Q1 and Q2 are connected together by a resistor R9. Resistor R9 in conjunction with resistors R1 and R2 establishes a DC bias for transistors Q1 and Q2. This bias must be greater than the peak pulse voltage of the AC pulses to prevent the pulses from reverse-biasing transistors Q1 and Q2. Since capacitors C3 and C4 are chosen to be effective shorts at the pulse frequency, the signal swing at the bases of transistors Q1 and Q2 is the same as the signal swing on telephone line 100. If the bias is insufficient, the basecollector junction of the transistors will clip the pulses.

At the AC pulse frequency, the impedances from tip lead T and ring lead R to ground GND must be matched to achieve longitudinal balance. In this circuit, the longitudinal impedance is the parallel combination of the circuitside impedance and the telephone line-side impedance. The line-side impedance is determined by resistors R1 and R2. Since resistors R1 and R2 are typically much larger than the circuit-side impedance, a precise match is not required. Transistors Q1 and Q2 are turned off at the pulse frequency and therefore do not need to have their gains matched.

In the basic circuit as described so far, transistors Q1 and Q2 will experience excessive power dissipation if a tip lead T is shorted to battery V1 or to ring lead R, or if ring lead R is shorted to ground GND or to tip lead T. With the sample component values given above, the circuit has a DC feed resistance of 15 Ω from ground GND to tip lead T, and also from ring lead R to battery V1. With a standard 48 V battery V1, the ring lead R-to-ground GND current is limited to 48 V/15 Ω, or 3.2 A, resulting in a power dissipation of 48 V·3.2 A=153.6 W. This is unacceptable.

Since the basic circuit is a resistive feed circuit, it supplies maximum current when the voltage across the circuit is maximum, and a progressively lower current at progressively lower voltages. But this is the opposite of what is desired: an ideal circuit would supply minimum current to faults, such as shorts, on telephone line 100, and would supply full current under normal operating conditions when the voltage drop across the circuit is small. The basic circuit is therefore modified to provide an approximation of the ideal circuit, namely, to limit both the current through the feed transistors Q1 and Q2 and the voltage across those transistors. This is effected by providing each of the transformerless controlled current sources with an appropriate control circuit implemented as follows.

Transistor Q1 is supplemented with an NPN transistor Q3 whose collector is connected to the base of transistor Q1, whose base is connected across resistor R5 to the emitter of transistor Q1 and across resistor R7 to ground GND, and whose emitter is connected to tip lead T. Correspondingly, transistor Q2 is supplemented with a PNP transistor Q4 whose collector is connected to the base of transistor Q2, whose base is connected through resistor R8 to battery V1 and through resistor R6 to the emitter of transistor Q2, and whose emitter is connected to ring lead R.

Transistors Q3 and Q4 are protection transistors for feed transistors Q1 and Q2. The protection transistors turn on if the current through feed transistors Q1 and Q2 is above a limit value or if the voltage across feed transistors Q1 and Q2 exceeds a limit value. The current limit is set by resistors R3 and R4. If the voltage drop across resistor R3 is greater than the base-emitter turn-on voltage (VBE) of transistor Q3, transistor Q3 turns on and diverts current from the base of transistor Q1 to limit the current through transistor Q1 to the value of VBE/R3. Similarly, if the voltage drop across resistor R4 is greater than the base-emitter turn-on voltage of transistor Q4, transistor Q4 turns on and diverts current from the base of transistor Q2 to limit the current through transistor Q2 to the value VBE/R4. Voltage limiting is performed for transistor Q1 by resistors R5 and R7. If the voltage divider formed by resistor R7 and resistors R3 and R5 creates a VBE drop across resistors R3 and R5, transistor Q3 turns on and transistor Q1 turns off. Transistor Q1 can be on only if the voltage across transistor Q1 is less than VBE·R7/(R3+R5). Correspondingly, voltage limiting is performed for transistor Q2 by resistors R6 and R8. If the voltage divider formed by resistor R8 and resistors R4 and R6 creates a VBE drop across resistors R4 and R6, transistor Q4 turns on and transistor Q2 turns off. Transistor Q2 can be on only if the voltage across transistor Q2 is less than VBE·R8/(R4+R6). The current and voltage limits thus depend on VBE.

VBE varies with temperature: an increase in temperature results in a decrease in VBE and hence a decrease in the current and voltage limits, and vice versa. This effect tends to stabilize circuit operation by inhibiting thermal runaway.

It is also desirable to protect the battery feed circuit against voltage surges on telephone line 100. For this purpose, battery V1 is connected through a diode D2 to ring lead R, ring lead R is connected through a diode D3 to tip lead T, and tip lead T is connected through a diode D1 to ground GND. If a positive voltage surge appears on either lead of telephone line 100, it is diverted by diodes D3 and D1 to ground; if a negative voltage surge appears on either lead of telephone line 100, it is diverted by diodes D2 and D3 to battery V1. Alternatively, a silicon-controlled rectifier (SCR) may be connected between battery V1 and ground to divert the negative voltage surges to ground instead of to battery V1.

The above-described circuit has the following three states: a state in which feed transistors Q1 and Q2 are turned off (off state); a state in which feed transistors Q1 and Q2 are current limiting (current limit state); and a state in which feed transistors Q1 and Q2 reduce the effective resistive feed value (resistive feed state).

For start-up conditions and faults, a large voltage is present across feed transistors Q1 and Q2, and so protection transistors Q3 and Q4 turn feed transistors Q1 and Q2 off (off state). Feed current then flows to telephone line 100 via resistors R1 and R2 and transistors Q3 and Q4, and via resistors R7 and R8 and the base-emitter junction of Q3 and Q4. In the off state, the current is limited by resistors R1, R2, R7 and R8. Transistors Q3 and Q4 are saturated via resistors R7 and R8.

After line 100 charges and the voltage across feed transistors Q1 and Q2 is insufficient to keep protection transistors Q3 and Q4 saturated, current starts to flow through feed transistors Q1 and Q2. This current is limited by the combination of voltage and current across transistors Q1 and Q2 (current limit state). As the voltage decreases, the current is allowed to increase up to the current limit value. In this state, feed transistors Q1 and Q2 limit the current delivered to the load. After line 100 is fully charged and the line current drops below the current limit value, protection transistors Q3 and Q4 turn off, and feed transistors Q1 and Q2 decrease the effective feed resistance by their gain (resistive feed state).

Due to unbalances in the circuit, it is not likely that both protection transistors Q3 and Q4 will activate, or at least activate simultaneously. However, the positive feedback in the circuit will cause the one transistor Q3 or Q4 which activates first to limit the current. The circuit may be designed asymmetrically to provide a preference for either transistor Q3 or Q4 to activate first. This does not reduce constraints if the circuit has to survive both shorts from ring lead R to ground GND and from tip lead T to battery V1. If the load current attempts to exceed the limit value, a protection transistor Q3 or Q4 starts to turn on and diverts some of the base current from its feed transistor Q1or Q2. This forces the voltage across feed transistor Q1 or Q2 to increase in an attempt to limit the current. The increase in voltage initially reduces the effective current limit value and eventually turns feed transistor Q1 or Q2 off when the voltage becomes sufficiently large.

In the case of a short between either tip lead T and battery V1 or ring lead R and ground GND, excessive voltage is present across one of the feed transistors Q1or Q2, and one of the protection transistors Q3 or Q4 turns that feed transistor off, with one of the resistor pairs R1 and R7 or R2 and R8 limiting the short circuit current. These resistors need to sustain shorts for indefinite periods of time.

In the case of a short from tip lead T to ring lead R, one of the protection transistors Q3 and Q4 limits current, while the other protection transistor stays in the resistive feed state. Again, one of the resistive pairs R1 and R7 or R2 and R8 limit the short circuit current.

The circuit can sustain shorts indefinitely, and automatically starts up when a fault is removed. Hence, it does not require microprocessor control.

The load presented by a digital telephone set to line 100 typically consists of a large capacitance and a DC-to-DC converter. The capacitance initially appears to the battery feed circuit as a short from tip lead T to ring lead R. Therefore, at start up, the battery feed circuit sees a large voltage drop and enters the off state, shutting down a feed transistor Q1 or Q2. The start-up current is set by resistors R1 and R2 in parallel with resistors R7 or R8. R1=R2=R7= R8=20 KΩ provides a start-up current of 4.8 mA from a 48 V supply. In-rush current limiting is not needed, because the start-up current is actually less than the operating current. The current charges the capacitance of the set, and after the capacitance is sufficiently charged, the voltage across feed transistors Q1 and Q2 is reduced to a value less than the limiting voltage, whereupon the current through feed transistors Q1 and Q2 is allowed to increase to the current limit value.

Of course, various changes and modifications to the illustrative embodiment described above will be apparent to those skilled in the art. For example, if the DC current is greater than the AC signal current, lines L1 and L2 can be coupled to the bases of Q1 and Q2. Also, complementary current limiters are not required; one circuit can be used for both sides. Such changes and modifications can be made without departing from the spirit and the scope of the invention and without diminishing its attendant advantages. It is therefore intended that such changes and modifications be covered by the following claims.

What is claimed is:

1. A transformerless battery feed circuit for a digital communications line having a pair of leads, comprising:

a pair of controlled transformerless current sources, one for each said lead, each for supplying direct current to its corresponding lead; and a pair of control circuits, one for each said current source, each sensing voltage across its corresponding current source and causing its corresponding current source to supply an amount of current that is inversely proportional to the sensed voltage, and each further sensing current supplied by its corresponding current source and causing its corresponding current source to limit its supplied current to below a predetermined maximum current.

2. The battery feed circuit of claim 1 wherein:

each control circuit further causes its corresponding current source to cease supplying current when the sensed voltage exceeds a predetermined maximum voltage.

3. The battery feed circuit of claim 1 wherein:

each current source presents a high impedance to digital signals on its corresponding lead and presents a low impedance to direct current on its corresponding lead.

4. The battery feed circuit of claim 1 wherein:

each current source comprises a high-gain transistor device having a collector terminal coupled to a source of power, having a base terminal resistively coupled to the source of power and capacitively coupled to its corresponding lead, and having an emitter terminal coupled to its corresponding lead.

5. The battery feed circuit of claim 4 wherein:

each control circuit comprises a transistor device having a collector terminal coupled to the base terminal of the corresponding high-gain transistor device, having a base terminal resistively coupled to the emitter terminal of the corresponding high-gain transistor device and to the source of power, and having an emitter terminal coupled to the corresponding lead.

6. The battery feed circuit of claim 5 wherein:

the base terminals of the high-gain transistor devices are resistively coupled to each other.

7. The battery feed circuit of claim 6 wherein:

the power source coupled to one of the current sources is a positive power source, the power source coupled to another of the current sources is a negative power source, and wherein the negative power source, the positive power source, and the pair of leads are coupled to each other by a unidirectional gating circuit that allows current to flow only from the negative power source to its corresponding lead, from the corresponding lead of the negative power source to the corresponding lead of the positive power source, and from the corresponding lead of the positive power source to the positive power source.

* * * * *